J. B. LESQUERRE.
OX COLLAR.
APPLICATION FILED APR. 20, 1910.

1,025,409.

Patented May 7, 1912.

Witnesses
B. Sommers
May Ellis

Inventor
Juan Bautista Lesquerre
By his Attorney

UNITED STATES PATENT OFFICE.

JUAN BAUTISTA LESQUERRE, OF BUENOS AIRES, ARGENTINA.

OX-COLLAR.

1,025,409. Specification of Letters Patent. Patented May 7, 1912.

Application filed April 20, 1910. Serial No. 556,563.

*To all whom it may concern:*

Be it known that I, JUAN BAUTISTA LESQUERRE, a citizen of Argentina, residing at No. 745 Calle Tucuman, in the city of Buenos Aires, Argentina, have invented a new and useful Ox-Collar, of which the following is a description.

This invention refers to a new ox collar characterized by the simplicity of its form and by the fact that it permits the animal to exert its full strength without being galled in the slightest degree.

From the remotest ages it has been the belief that the greatest strength of the ox was in its head, and for that reason we see to-day the most primitive methods in use for harnessing that animal, consisting of the clumsy yoke fastened to the neck or to the back of the head.

I have found that the strength of the head is only utilized to support the yoke and the pole or draw chain which is usually attached to the latter, but as far as tractive force is concerned, being in a horizontal direction it can not under any circumstances be better from the head than from the breast since it is developed by the movement of the legs. This being the case it is logical that if the force is utilized by means of an adequate collar not only can the animal exert greater strength but also having the head free from the heavy yoke it will be more agile and can move with greater freedom.

Although attempts have been made from time to time to use collars for harnessing bullocks, they have given negative results owing to the fact that they have been made without proper study of the anatomy of the animal, and in such a form that the latter was invariably made sore, nearly always on the shoulder or rather directly in front of the joint of the shoulder comprising the the part between the scapula and the humerus. It is only for this reason that collars for bullocks have not been successfully used.

As will be seen hereinafter, the collar of my invention, on account of its special form, is perfectly adapted to the withers and back, leaving the shoulders completely free so that the animal can exercise its entire strength without being hurt or incommoded in the least.

Figure 1:
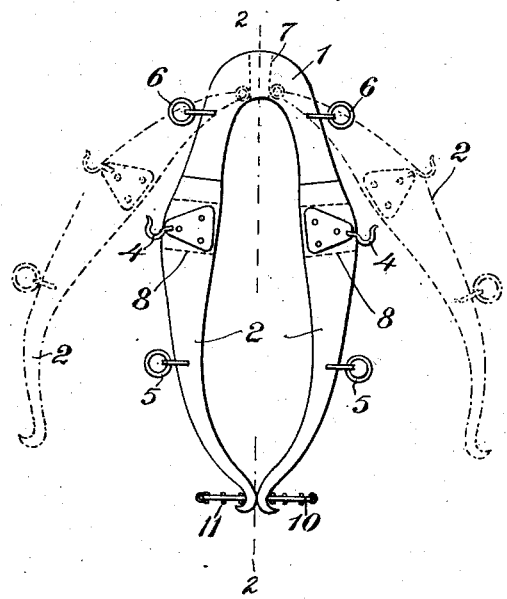
Figure 2:
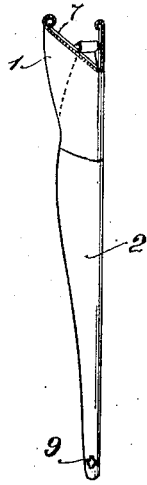
Figure 3:
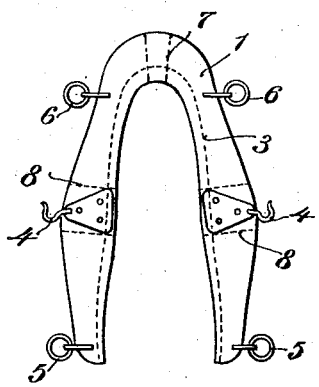

In the accompanying drawing illustrating my invention; Figure 1 is a front elevation of an articulated ox collar constructed according to my invention; the open position of the extended sides being indicated by dotted lines. Fig. 2 is a section on line 2—2 of Fig. 1. Fig. 3 is a front elevation of a modified form.

The collar comprises a hollow arch-shaped rigid tree 1 substantially V-shaped in cross section and adapted to lie on the scapula or withers of the animal. Pivotally connected to the upper part of the tree are two hollow side pieces 2, 2, which extend below the tree and diverge at a point below the latter just above the joint of the scapula and humerus. As shown in Fig. 3 the tree and sides may be formed in one piece. The lower parts of the sides do not extend much below the rings 5 and when the collar is made in one piece it is preferably reinforced by a metallic piece 3 which conforms to the contour of the inside of the collar. Both collars are provided on their front faces with hooks 4, preferably placed substantially midway between the top of the tree and the lower ends of the sides, to support the shaft; with rings 5, placed below the hooks and to which the traces of the harness are connected and with rings 6 placed in the usual position for the reins. Owing to the parts being hollow, reinforcing springs 7 and 8, conforming to the cross sectional shape of the arch of the tree and the sides respectively, are provided at the points subjected to the greatest strain. These springs give the necessary elasticity to the collar, softening the effect of the blows produced by starting.

To fasten the sides 2, in the form of construction represented in Fig. 1, I have provided a perforation 9 at each end through which passes a bolt 10 provided with small pins 11 which permit the sides to be retained in a more or less open position. The form of the curve on the rear face of the collar in the upper part of the tree, as also that of the two sides, makes the collar perfectly adapted to the withers and back of the animal. In the same manner the lower curve or opening of the sides serves the purpose of leaving the shoulder joint perfectly free.

This type of collar permits the manufacture of the same either of steel sheets in order to diminish the total weight, or of wood, or of the two combined, with or without pads, or in fact, of any material which may be thought best, without affecting in the least my invention.

I claim:

An ox collar comprising a hollow arch portion V-shaped in cross section adapted to embrace the scapula of an ox, hollow extension members pivoted to the arch and diverging therefrom at the joint of the scapula and humerus and reinforcing springs in the arch and extension members, the rear faces of said arch portion and extension members being curved to conform to the contour of the back and withers respectively, of an ox.

In testimony whereof I have signed my name to this specification in the presence of two subscribing witnesses.

JUAN BAUTISTA LESQUERRE.

Witnesses:
ANTONIO L. BELLA,
JOAQUIN COMAS.

Copies of this patent may be obtained for five cents each, by addressing the "Commissioner of Patents, Washington, D. C."